United States Patent
Malik

(10) Patent No.: US 7,752,275 B2
(45) Date of Patent: Jul. 6, 2010

(54) METHOD AND APPARATUS FOR CONFIGURING ELECTRONIC MAIL FOR DELIVERY OF ELECTRONIC SERVICES

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 331 days.

(21) Appl. No.: 11/292,639

(22) Filed: Dec. 2, 2005

(65) Prior Publication Data

US 2006/0085513 A1    Apr. 20, 2006

Related U.S. Application Data

(63) Continuation-in-part of application No. 09/563,930, filed on May 4, 2000, now Pat. No. 7,007,066.

(51) Int. Cl.
*G06F 15/16* (2006.01)
(52) U.S. Cl. .................. 709/206; 709/203; 705/27
(58) Field of Classification Search ............... 709/206, 709/201, 219, 204, 203, 207, 205, 27, 26; 705/27, 26
See application file for complete search history.

(56) References Cited

U.S. PATENT DOCUMENTS

| | | | |
|---|---|---|---|
| 5,375,235 A | 12/1994 | Berry et al. | |
| 5,559,800 A | 9/1996 | Mousseau et al. | |
| 5,649,222 A | 7/1997 | Mogilevsky | |
| 5,781,901 A | 7/1998 | Kuzma | |
| 5,796,948 A | 8/1998 | Cohen | |
| 5,819,260 A | 10/1998 | Lu et al. | |
| 6,012,075 A | 1/2000 | Fein et al. | |
| 6,026,410 A | 2/2000 | Allen et al. | |
| 6,057,841 A | 5/2000 | Thurlow et al. | |
| 6,073,133 A | 6/2000 | Chrabaszcz | |
| 6,199,103 B1 | 3/2001 | Sakaguchi et al. | |
| 6,212,553 B1 | 4/2001 | Lee et al. | |
| 6,219,694 B1 | 4/2001 | Lazaridis et al. | |
| 6,295,058 B1 * | 9/2001 | Hsu et al. | ............... 715/769 |
| 6,334,142 B1 | 12/2001 | Newton et al. | |
| 6,349,295 B1 | 2/2002 | Tedesco et al. | |
| 6,356,937 B1 | 3/2002 | Montville et al. | |
| 6,377,949 B1 | 4/2002 | Gilmour | |
| 6,405,225 B1 | 6/2002 | Apfel et al. | |
| 6,453,338 B1 | 9/2002 | Shiono | |

(Continued)

OTHER PUBLICATIONS

Southwest Missouri State University; "Introduction to Microsoft", Computer Services, Southwest Missouri State University, Springfield, MO, 1998, 39 pages.

(Continued)

*Primary Examiner*—Lashonda T Jacobs
(74) *Attorney, Agent, or Firm*—Thomas, Kayden, Horstemeyer & Risley, LLP

(57) ABSTRACT

An event manager is disclosed for sending services through an email communication. The event manager provides a template through which a user may select an available service that he wishes to send as an attachment to an email. The event manager enables the user to attach electronic services such as an audio file, a video file, a gift certificate, or a money transfer, among others, to an email message and package it with items such as wallpaper or background music, among others, to send to another email user.

16 Claims, 11 Drawing Sheets

U.S. PATENT DOCUMENTS

| | | | |
|---|---|---|---|
| 6,460,074 B1 | 10/2002 | Fishkin | |
| 6,505,237 B2 | 1/2003 | Beyda et al. | |
| 6,507,865 B1 | 1/2003 | Hanson et al. | |
| 6,701,378 B1 | 3/2004 | Gilhuly et al. | |
| 6,725,228 B1 | 4/2004 | Clark et al. | |
| 6,779,019 B1 | 8/2004 | Mousseau et al. | |
| 6,785,712 B1 | 8/2004 | Hogan et al. | |
| 6,859,213 B1* | 2/2005 | Carter | 715/752 |
| 6,898,622 B1* | 5/2005 | Malik | 709/206 |
| 6,970,908 B1* | 11/2005 | Larky et al. | 709/206 |
| 6,981,023 B1 | 12/2005 | Hamilton et al. | |
| 7,007,066 B1* | 2/2006 | Malik | 709/206 |
| 7,016,937 B1 | 3/2006 | Malik | |
| 7,315,828 B1* | 1/2008 | McCarthy et al. | 705/26 |
| 7,380,212 B2* | 5/2008 | Cody et al. | 715/752 |
| 7,447,743 B1 | 11/2008 | Jordan, Jr. | |
| 7,451,187 B2 | 11/2008 | Malik | |
| 2001/0037315 A1* | 11/2001 | Saliba et al. | 705/70 |
| 2002/0016818 A1 | 2/2002 | Kirani et al. | |
| 2002/0104026 A1 | 8/2002 | Barra et al. | |
| 2002/0116508 A1 | 8/2002 | Khan et al. | |
| 2003/0028600 A1 | 2/2003 | Parker | |
| 2003/0135570 A1* | 7/2003 | Anquetil | 709/206 |
| 2003/0187797 A1* | 10/2003 | Song et al. | 705/45 |
| 2004/0122905 A1* | 6/2004 | Smith et al. | 709/206 |
| 2005/0165641 A1* | 7/2005 | Chu et al. | 705/14 |
| 2006/0026119 A1* | 2/2006 | Mirrashidi et al. | 707/1 |
| 2006/0031309 A1 | 2/2006 | Luoffo et al. | |
| 2006/0089972 A1* | 4/2006 | Malik | 709/206 |
| 2007/0005713 A1* | 1/2007 | LeVasseur et al. | 709/206 |
| 2007/0011246 A1* | 1/2007 | Wu | 709/206 |
| 2007/0083602 A1* | 4/2007 | Heggenhougen et al. | 709/206 |
| 2007/0143419 A1 | 6/2007 | Plas | |
| 2007/0282957 A1* | 12/2007 | Van Belle et al. | 709/206 |
| 2007/0291911 A1* | 12/2007 | Visser | 379/88.13 |
| 2008/0098073 A1* | 4/2008 | Coleman et al. | 709/206 |
| 2008/0098078 A1 | 4/2008 | Daniell | |
| 2009/0094335 A1 | 4/2009 | Edmonds et al. | |
| 2009/0172399 A1 | 7/2009 | Schmid | |
| 2010/0070602 A1* | 3/2010 | Malik, Sr. | 709/206 |

OTHER PUBLICATIONS

Mosher; "Recieving and Responding to E-mail messages", http://www.windowsitlibrary.com/Content/238/12/2.html, Feb. 1997, 6 pages.
Fulton; "Easy Microsoft Outlook 97", J. Que , Copyright 1997, pp. 50-51 and 70-77.
Mosher; "Sending E-mail Messages", Duke Press, Feb. 1997, 3 pages.
Mosher; "Sending E-mail Messages (Inserting Filles, Messages, and Objects)", Duke Press, Feb. 1997, 5 pages.
Mosher; "Receiving and Responding to E-mail Messages", Duke Press, Feb. 1997, 4 pages.
Malik; U.S. Appl. No. 09/563,927, filed May 4, 2000.
Malik; U.S. Appl. No. 09/563,930, filed May 4, 2000.
Malik; Non- Final Rejection mailed Sep. 17, 2003; U.S. Appl. No. 09/563,927, filed May 4, 2000.
Malik; Non- Final Rejection mailed Mar. 22, 2004; U.S. Appl. No. 09/563,927, filed May 4, 2000.
Malik; Final Rejection mailed Sep. 17, 2004; U.S. Appl. No. 09/563,927, filed May 4, 2000.
Malik; Final Rejection mailed Sep. 26, 2004; U.S. Appl. No. 09/563,927, filed May 4, 2000.
Malik; Examiner Interview Summary Record mailed Oct. 26, 2004; U.S. Appl. No. 09/563,927, filed May 4, 2000.
Malik; Notice of Allowance and Fees Due mailed Apr. 26, 2005; U.S. Appl. No. 09/563,927, filed May 4, 2000.
Malik; Notice of Allowance and Fees Due mailed Dec. 15, 2005; U.S. Appl. No. 09/563,927, filed May 4, 2000.
Malik; Non- Final Rejection mailed Apr. 4, 2003; U.S. Appl. No. 09/563,930, filed May 4, 2000.
Malik; Non- Final Rejection mailed Sep. 8, 2003; U.S. Appl. No. 09/563,930, filed May 4, 2000.
Malik; Final Rejection mailed Feb. 25, 2004; U.S. Appl. No. 09/563,930, filed May 4, 2000.
Malik; Advisory Action mailed Jul. 2, 2004; U.S. Appl. No. 09/563,930, filed May 4, 2000.
Malik; Non- Final Rejection mailed Sep. 9, 2004; U.S. Appl. No. 09/563,930, filed May 4, 2000.
Malik; Examiner Interview Summary Record mailed Oct. 5, 2004; U.S. Appl. No. 09/563,930, filed May 4, 2000.
Malik; Notice of Allowance and Fees Due mailed Mar. 31, 2005; U.S. Appl. No. 09/563,930, filed May 4, 2000.
Malik; Notice of Allowance and Fees Due mailed Nov. 18, 2005; U.S. Appl. No. 09/563,930, filed May 4, 2000.
Malik; U.S. Appl. No. 11/296,754, filed Dec. 7, 2005.
Malik; Non- Final Rejection mailed Mar. 25, 2008; U.S. Appl. No. 11/296,754, filed Dec. 7, 2005.
Introduction to Microsoft Outlook; revised Feb. 1998 (SMC), 36 pages.
Malik; Examiner Interview Summary mailed Jun. 4, 2008 for U.S. Appl. No. 11/296,754, filed Dec. 7, 2005.
Malik; Final Rejection mailed Nov. 4, 2008 for U.S. Appl. No. 11/296,754, filed Dec. 7, 2005.
Malik; Non-Final Rejection mailed Apr. 14, 2009 for U.S. Appl. No. 11/296,754, filed Dec. 7, 2005.
Jordan; Notice of Allowance and Fees due mailed Aug. 1, 2008 for U.S. Appl. No. 09/943,836, filed Aug. 31, 2001.
Zellner; Non-Final Rejection mailed Jan. 6, 2010 for U.S. Appl. No. 11/928,824, filed Oct. 30, 2007.
"AirDoc Platform™," printed from http://www.arizan.com/solutions/solutions_airdoc_platform.html on Feb. 20, 2002; 2 pages.
"BlackBerry Wireless Email Enhancements," printed from http://www.mi8.com/static/product_detail/BlackBerryAddon.asp on Feb. 20, 2002; 3 pages.
"Itrezzo Integrated Messaging," printed from http://www.itrezzo.com/services.htm on Feb. 20, 2002; 3 pages.
"Itrezzo Licenses Arizan Technology to Extend Features for Wireless Users," printed from http://www.itrezzo.com/Press_Releases/rim_blackberry_press_011602.ntm on Feb. 20, 2002; 2 pages.
"METAmessage for Wireless," printed from http://onsettechnology.com/pr2_mm.htm on Feb. 20, 2002; 3 pages.
"NeedText Attachment Opener," printed from http://www.needtext.net/attachment/index.xml on Feb. 20, 2002; 2 pages.
"Onset Announces Email Attachment and Fax Solutions," printed from http://www.intranetjournal.com/articles/200102/na_02_21_01d.html on Feb. 20, 2002; 4 pages.
"Using My Docs Online with a RIM BlackBerry™ Pager," printed from http://www.mydocsonline.com/info_using_blackberry.html on Feb. 20, 2002; 2 pages.
Malik; Final Rejection mailed Apr. 17, 2008 for U.S. Appl. No. 10/326,250, filed Dec. 19, 2002.
Malik; Final Rejection mailed Jun. 5, 2007 for U.S. Appl. No. 10/326,250, filed Dec. 19, 2002.
Malik; Non-Final Rejection mailed Jun. 2, 2006 for U.S. Appl. No. 10/326,250, filed Dec. 19, 2002.
Malik; Non-Final Rejection mailed Oct. 6, 2008 for U.S. Appl. No. 10/326,250, filed Dec. 19, 2002.
Malik; Non-Final Rejection mailed Oct. 23, 2007 for U.S. Appl. No. 10/326,250, filed Dec. 19, 2002.
Malik; Non-Final Rejection mailed Nov. 16, 2006 for U.S. Appl. No. 10/326,250, filed Dec. 19, 2002.
Malik; U.S. Patent Application for U.S. Appl. No. 10/326,250, filed Dec. 19, 2002.
Jordan; Examiner Interview mailed Mar. 30, 2005 for U.S. Appl. No. 09/943,836, filed Aug. 31, 2001.
Jordan; Examiner Interview mailed Apr. 7, 2006 for U.S. Appl. No. 09/943,836, filed Aug. 31, 2001.
Jordan; Examiner Interview mailed Nov. 30, 2004 for U.S. Appl. No. 09/943,836, filed Aug. 31, 2001.
Jordan; Examiner Interview mailed Dec. 20, 2006 for U.S. Appl. No. 09/943,836, filed Aug. 31, 2001.

Jordan; Final Rejection mailed Feb. 8, 2006 for U.S. Appl. No. 09/943,836, filed Aug. 31, 2001.
Jordan; Final Rejection mailed Mar. 1, 2005 for U.S. Appl. No. 09/943,836, filed Aug. 31, 2001.
Jordan; Final Rejection mailed Sep. 24, 2007 for U.S. Appl. No. 09/943,836, filed Aug. 31, 2001.
Jordan; Non-Final Rejection mailed Jan. 31, 2008 for U.S. Appl. No. 09/943,836, filed Aug. 31, 2001.
Jordan; Non-Final Rejection mailed Apr. 10, 2007 for U.S. Appl. No. 09/943,836, filed Aug. 31, 2001.
Jordan; Non-Final Rejection mailed Aug. 18, 2005 for U.S. Appl. No. 09/943,836, filed Aug. 31, 2001.
Jordan; Non-Final Rejection mailed Oct. 11, 2006 for U.S. Appl. No. 09/943,836, filed Aug. 31, 2001.
Jordan; Non-Final Rejection mailed Oct. 22, 2004 for U.S. Appl. No. 09/943,836, filed Aug. 31, 2001.
Jordan; Notice of Allowance and Fees due mailed Aug. 1, 2008 for U.S. Appl. No. 10/326,250, filed Dec. 19, 2002.
Jordan; U.S. Patent Application for U.S. Appl. No. 09/943,836, filed Aug. 31, 2001.
Bott and Person. Special Edition using Windows 98 Second Edition. Que. Dec. 1999, 3 pages.
MAD Solutions; Attachment Executive Version 3.0, Apr. 2001; pp. 1-39.
Qualcomm. Eudora Email User Manual for Windows Version 5.1, Mar. 2001; 3 pages.
Sams. Sams teach yourself windows 98 in 10 minutes. Sams Publishing. May 1998; 3 pages.
Sperry Software. Attachment Save for Outlook 2000/2002. Dated to Aug. 6, 2002 via wayback machine at http://www.archive.org; 2 pages.
Jordan; Notice of Allowance and Fees due mailed Aug. 1, 2008 for U.S. Appl. No. 09/943,836, filed Aug. 31, 2001.
Malik; Final Office Action mailed Nov. 23, 2009 for U.S. Appl. No. 11/296,754, filed Dec. 7, 2005.
Malik; Notice of Allowance mailed Mar. 26, 2010 for U.S. Appl. No. 11/296,754 mailed Dec. 7, 2005.

* cited by examiner

Figure 3

What would you like to do?

o Review received messages o Compose new e-mail o Reply to a received message

Figure 4

What type of e-mail would like to send?

o Message o Attachment o Message with Attachment

Figure 5

> To whom would you like to send your e-mail?
>
> Single Recipient
>
> o Within Network
>
> o Outside of Network
>
> Multiple Recipients
>
> o I will supply addresses
>
> o Select from Mail group

Figure 6

> What type of attachments are being sent?
>
> o Word processing documents
>
> o Spreadsheet files
>
> o Graphics files
>
> o Video/Audio files
>
> o Speech files

Figure 7

```
┌─────────────────────────────────────────┐
│            E-Mail Message               │
│                                         │
│  To:    [_____]         │
│                                         │
│  From:                                  │
│                                         │
│  Re:    [_____]         │
│                                         │
│  Message:                               │
│         [_____]         │
│         [                     ]         │
│         [_____]         │
└─────────────────────────────────────────┘
```

Figure 8

```
┌─────────────────────────────────────────┐
│           E-Mail Attachment             │
│                                         │
│  To:    [_____]         │
│                                         │
│  From:                                  │
│                                         │
│  Re:    [_____]         │
│                                         │
│  File Name and Path:                    │
│         [_____]         │
│         [                     ]         │
│         [_____]         │
└─────────────────────────────────────────┘
```

METHOD AND APPARATUS FOR CONFIGURING ELECTRONIC MAIL FOR DELIVERY OF ELECTRONIC SERVICES

CROSS-REFERENCE TO RELATED APPLICATION

This application is continuation-in-part of U.S. utility application entitled, "Method and Apparatus for Configuring Electronic Mail according to a User-Selected Type," having Ser. No. 09/563,930, filed May 4, 2000, now U.S. Pat. No. 7,007,066, which is entirely incorporated herein by reference.

FIELD OF THE INVENTION

The present invention relates to the transmission of electronic mail over computer networks, and more particularly, to a method and apparatus for configuring the composition of electronic mail according to a type and category selected by the user from a menu of options.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

E-mail application programs are typically configured for generating messages in the form of memoranda. These programs guide a user to "compose" an e-mail message by providing a platform for entering at least one outgoing e-mail address, a "subject" heading, and a "body" for the actual message. When the user completes typing the message and presses the "send" key, the message is transmitted over the network and arrives at the provided destination address. E-mail is often used for sending relatively short messages that are only a few sentences in length.

Most e-mail application programs also allow a user to attach a file to be sent along with a message as an "attachment." In the accompanying e-mail message, the sender may introduce or explain the significance of the attachments. Attachment files might include word processing documents, graphics files, executable programs, spreadsheet reports, etc. A recipient will receive the e-mail message plus any attached files, which may then be opened and accessed through the appropriate application software. In many applications, it is preferable to send documents through e-mail attachments instead of a facsimile because the recipient can then store, edit, and print an original file. For long-distance communications, it is also less costly to send documents via e-mail as compared with a facsimile.

In order to send an attachment with most e-mail application programs, a user first composes a message in the ordinary course by specifying a destination address, a subject heading, and a message. The user then selects the "attachment" icon and selects a file that is stored in memory or on floppy disk. Upon selecting a file and selecting the "ok" icon, the user finally selects the "send" option to begin transmission of the e-mail.

There are several problems that users often encounter when sending e-mail attachment files. As an initial matter, it is possible that a user cannot understand how to utilize the e-mail application program to compose e-mail, review received e-mail, or reply to e-mail that was received. Further, it is also relatively common for a user to forget to send an attachment along with a message when composing an e-mail. In some circumstances, sending an e-mail without the intended attachments can lead to confusion, or at least embarrassment, because the user referred in the sent message to an attached file that has not been sent. These problems significantly reduce the benefits of e-mail systems and may negatively affect a user's productivity when engaging in electronic mail communications.

Email has also been a convenient means for sending messages and attaching files, but it has not been configured to incorporate management functions for providing services.

SUMMARY OF THE INVENTION

In view of the difficulties encountered with sending attachments to e-mail communications described above, there is a need for a method and apparatus for configuring an electronic mail communication such that the user is provided a template through which services can be attached.

In accordance with exemplary embodiments, an event manager can provide services in an email application by: displaying a template of services; receiving a selection from the template of services; attaching the service to an email message; and sending the email message.

BRIEF DESCRIPTION OF THE DRAWINGS

FIG. 3 is a graphical user interface of an initial menu of e-mail activities in an e-mail application program of the present invention.

FIG. 4 is a graphical user interface of a secondary menu of e-mail types in an e-mail application program of the present invention.

FIG. 5 is a graphical user interface of a template for composing an e-mail message according to the present invention.

FIG. 6. is a graphical user interface of a template for composing an e-mail attachment according to the present invention.

FIG. 7 is a graphical user interface of a menu according to the present invention.

FIG. 8 is a graphical user interface of a menu according to the present invention.

DETAILED DESCRIPTION

Figure 1A:
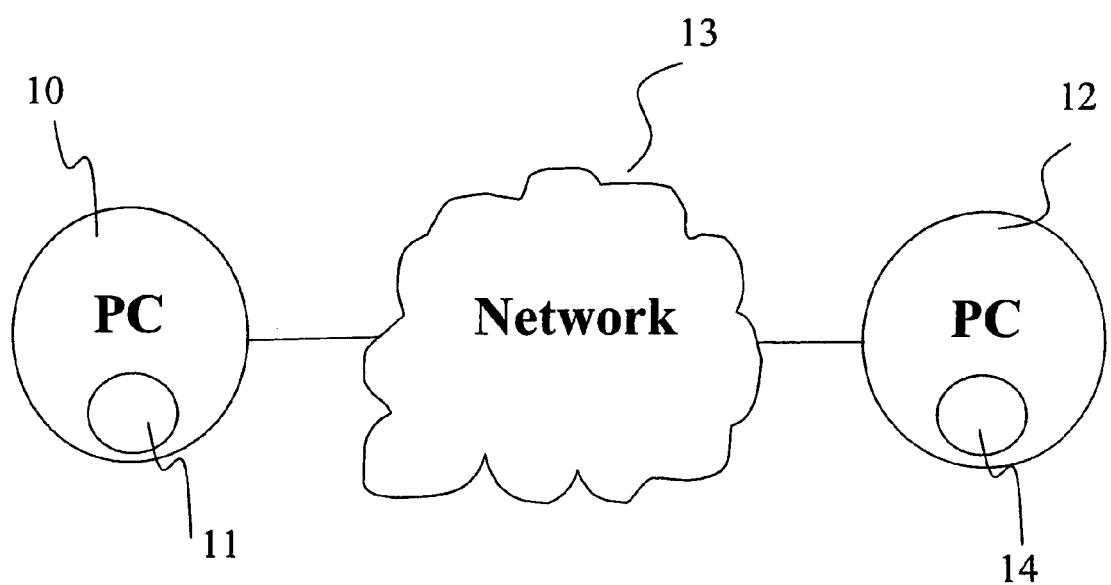
FIG. 1a is a schematic diagram of a basic computer network system in accordance with an embodiment of the present invention.

The present invention will now be described in more detail with reference to the figures. FIG. 1a is a schematic diagram of a basic computer network system in accordance with a preferred embodiment of the present invention, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LANs or WANs, the world wide web, or any combination thereof. Computers 10 and 12 may be the only computers connected to the network 13, or the network may be shared by many other computers.

The configuration of the e-mail application interface of the present invention prompts the user to first specify what type or category of e-mail communication is to be transmitted. For example, with regard to e-mail "types," a user may wish to simply send an e-mail message, or may intend to send solely an e-mail attachment file. As another type of e-mail communication, the user may wish to send an e-mail message accompanied by an attachment file. These are three different types of e-mail communications. There are also several categories associated with an e-mail communication that is to be composed. For example, the user may wish to send the e-mail to a single recipient or to a plurality of recipients. If the user chooses to attach a file, there are also several categories of attachments, such as wordprocessing files, graphics files, audio/video files, or speech files. Once the user selects the type and categories associated with the e-mail communication to be composed, an e-mail application program can then configure the e-mail communication to include all of the required fields to ensure proper transmission of a properly composed e-mail.

The user chooses the type and category associated with the e-mail communication to be composed according to a menu provided to the user. The user can then select options and features from the menu, which govern the configuration of the resulting e-mail communication. The user can opt to customize the menu to add or remove features in order to facilitate rapid composition of e-mail communications. According to the type and categories selected by the user, the e-mail application program provides a series of templates for which the user supplies information. Transmission of the e-mail communication is suspended until the user supplies all of the information required for each selected e-mail component.

Figure 1B:
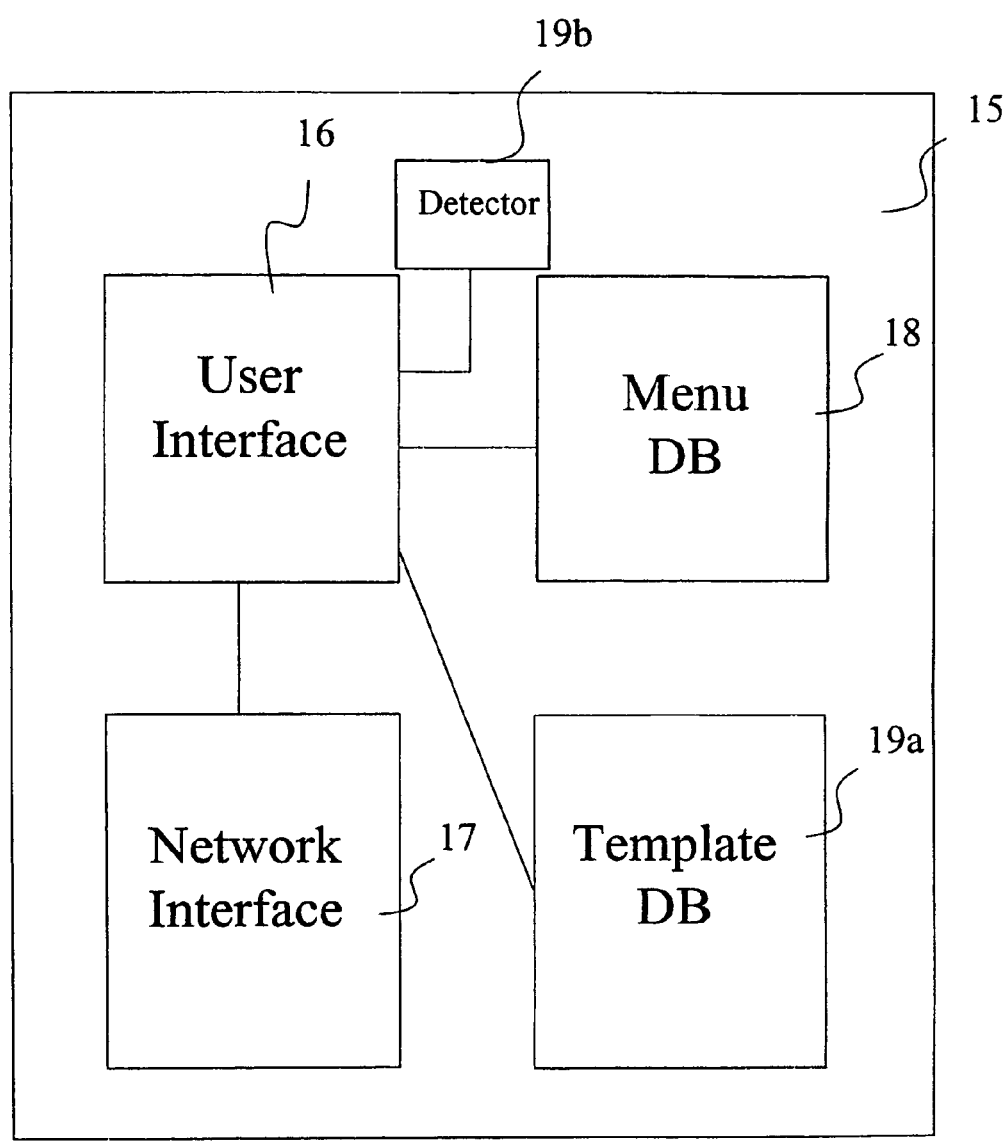
FIG. 1b is a schematic diagram of an e-mail communications system in accordance with an embodiment of the present invention.

FIG. 1b illustrates a schematic of an e-mail communications system according to this embodiment. E-mail communications system 15 includes a user interface 16 providing a user display and receiving information input from the user. Attached to user interface 16 is network interface 17, which may be connected to a LAN, data line, or any other networking communications interface for transmitting and receiving e-mail communications. The user interface 16 is connected to a first database, which is a menu database 18. The menu database stores data pertaining to all menus to be provided to the user, which provide options in composing e-mail communications. The user interface is additionally attached to a second database, which is a template database 19. The template database 19 stores information necessary for providing templates, which are used for composing e-mail communications having the user-specified options from the menu database 18. A detector 19b detects whether the user has supplied information for each of the fields in the template.

Figure 2:
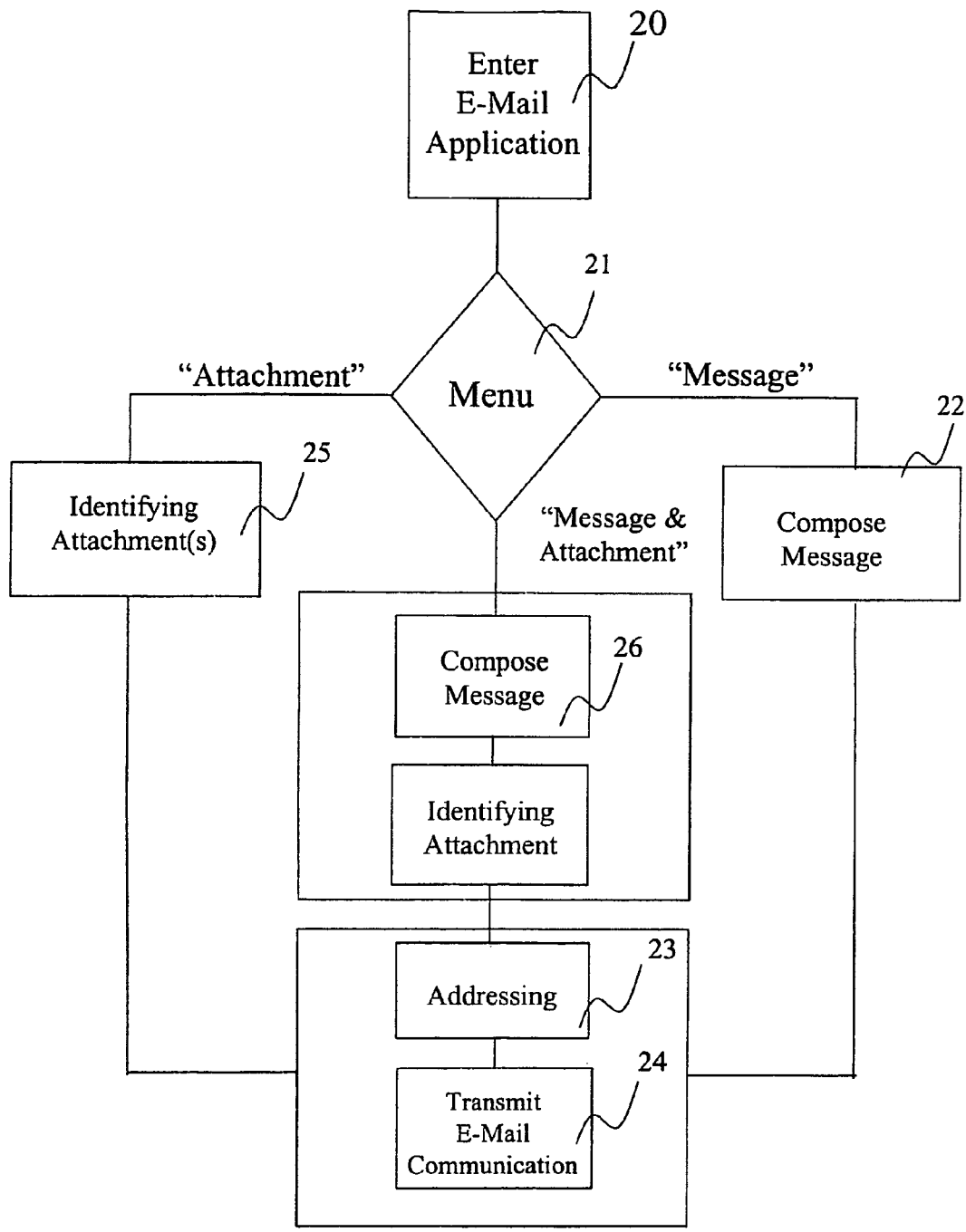
FIG. 2 is a flow diagram of an e-mail menu configuration embodiment of the present invention.

FIG. 2 illustrates the operation of the e-mail configuration application according to this embodiment. Upon the selection of the e-mail communication application 20, the system first prompts the user to select from a menu the type of e-mail communication that is to be transmitted, as in step 21. Once the user chooses from the menu of e-mail communication categories, the system configures the e-mail communication to facilitate composition of each requisite portion of the desired e-mail communication.

If the user chooses to simply send an e-mail message, then the system provides a template for composing a message, as in step 22. Once the user completes the message and indicates that the message is finished, the user enters the destination address information, as in step 23, and the message is then sent, according to step 24. Likewise, if the user chooses to simply send an attachment file, the system requires the user to identify one or more files to be sent as an e-mail communication, as in step 25. Once the user finishes identifying all attachments that are to be sent, the system then prompts the user to enter the destination address information and then sends the attachments, as in steps 23 and 24, respectively. In this embodiment, the system will not transmit an e-mail message or an attachment until it detects that the user supplied all of the necessary components of a message or an attachment, respectively.

If the user's menu selection indicates that the desired transmission is an e-mail message and an e-mail attachment, the system provides templates to the user for both components of the e-mail communication, as in step 26. The system does not transmit the e-mail communication until both the requisite components of an e-mail message and at least one attachment file are provided.

The system described in this embodiment is configured to transmit e-mail communications along the network illustrated in FIG. 1. E-mail communications interface 11 within computer 10 can incorporate the above-described features to provide prompts and templates for composition of e-mail messages, e-mail attachments, or other combinations e-mail communications. Once the e-mail communication described with respect to FIG. 2 is "sent," as in step 24, the e-mail communication is propagated along network 13 to computer 12.

FIGS. 3-7 show examples of graphical user interface (GUI) screen displays, which may be used according to the invention to begin configuration of an e-mail communication. Of course, these may be displayed on a monitor for a computer terminal, workstation, etc. The GUI in FIG. 3 provides an example of an initial menu for the user to choose how to utilize the e-mail application program. The user can choose between "Review received message," "Compose new e-mail," or "Reply to received message." This system is not limited to these three delineated activities, but may additionally include other activities associated with electronic mail communications, such as editing a pre-composed message.

If the user chooses to "Compose a new e-mail," a new menu is displayed, for example, as the menu shown in FIG. 4. The user is provided with a menu of three different types of e-mail communications to send. If the user chooses to send a "Message," the GUI as shown in FIG. 5 next appears on the screen. This GUI provides a template for composing an e-mail message. By selecting the field labelled "To" in the template, another screen appears that requires the user to define a recipient or a group of recipients, as shown in FIG. 7. If the user elects to send an e-mail to a group of recipients, transmission of the e-mail is suspended until at least two recipients are identified.

If the user chooses to compose an attachment, a template is displayed as in FIG. 6. The template provides all of the fields required for composing an e-mail attachment. As described above, the user first supplies destination addresses according to the GUI in FIG. 7. The system then provides a GUI to assist in identifying the file to be attached, as in FIG. 8. This GUI allows the user to specify what category of files are to be attached. The system can then provide more screens to assist the user in locating the files to be attached.

If the user elects to send a "Message with attachment," the template for configuring an attachment is presented once the template for a message is completed. Therefore, the user will not forget to attach the intended files along with the composed e-mail message.

Thus, it is readily seen that the method and system of the present invention provides for improved e-mail communications when e-mail attachments are to be transmitted from the user's computer to another. The system detects when the user intends to send an e-mail attachment, and reminds the user to configure an e-mail attachment prior to the transmission of the e-mail communication.

Figure 9:
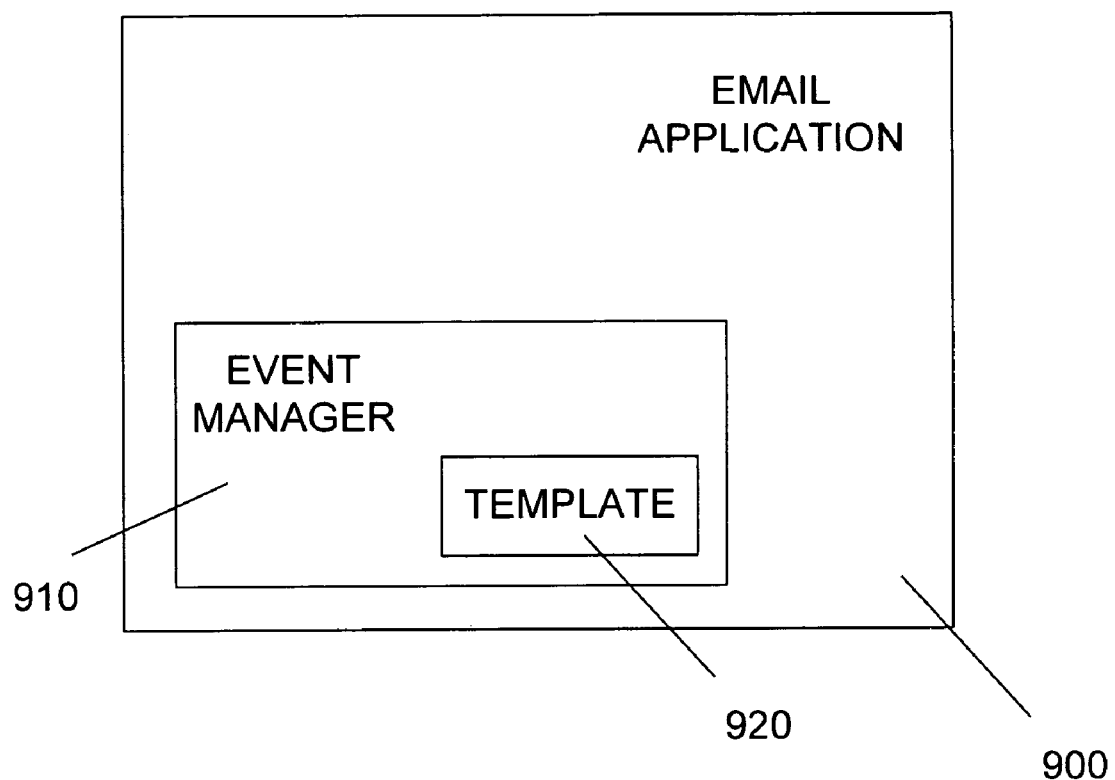
FIG. 9 is a block diagram of an email application with an event manager module with a template.
Figure 10:
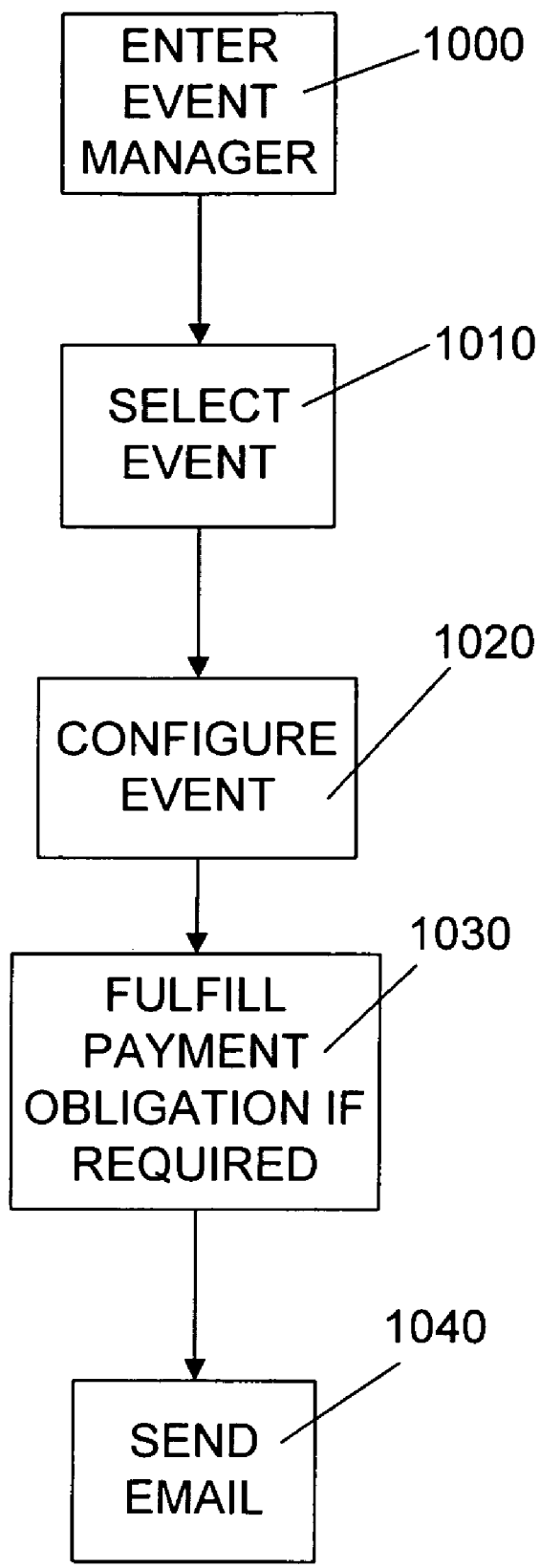
FIG. 10 is a flow diagram of the operations for a user to perform to use the event manager of FIG. 9.
Figure 11:
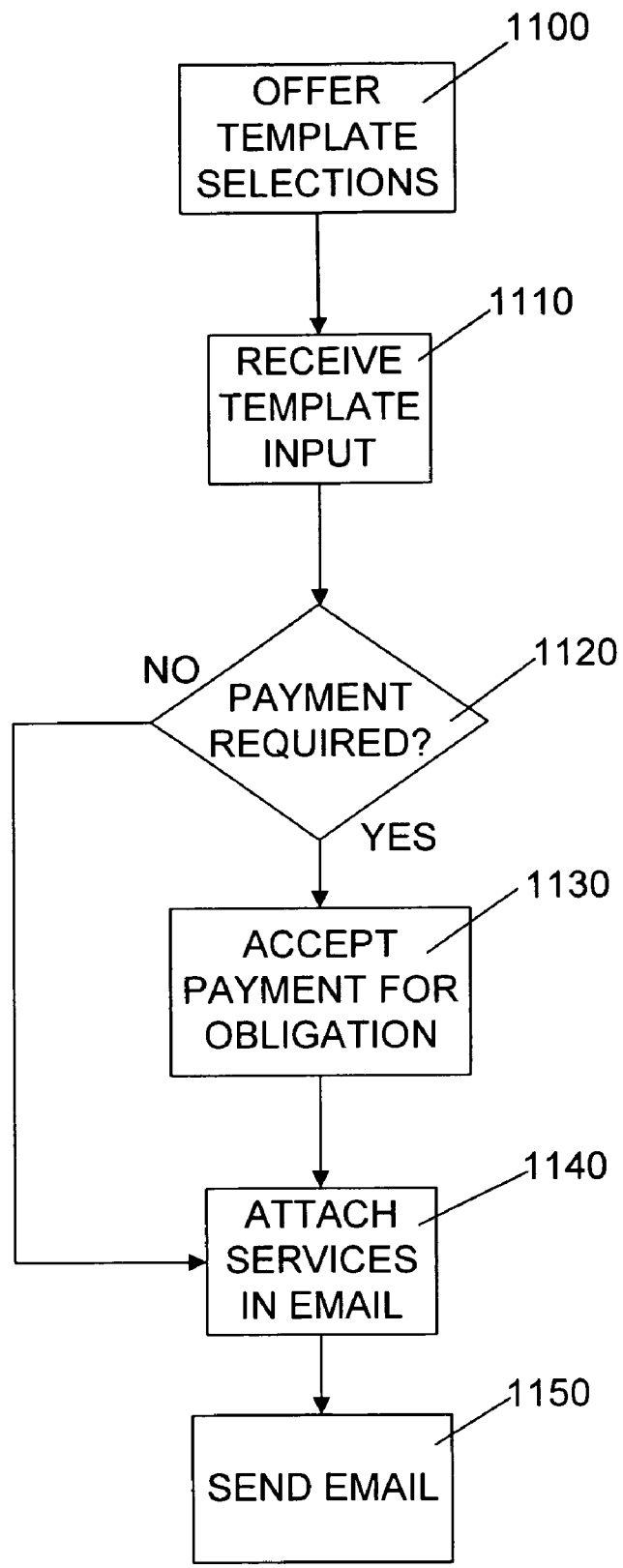
FIG. 11 is a flow diagram of the operations of the event manager of FIG. 9.

Exemplary embodiments as provided in FIGS. 9, 10, and 11, employ an event manager 910 (EM) in email application 900. A template 920 can be set up in EM 910 for various forms of e-mail communications. EM 910 can enable the management of events or services through template 920 in email application 900. The types of events or services that can be managed in EM 910 are unlimited; but nonlimiting examples can range from simple letters to coordination of multi-media events. One nonlimiting example of template 920 is a form for a formal letter that requires follow-up. In a message that requires follow-up, a user may expect a response in return. Another nonlimiting example includes a less formal conversational mode.

Another embodiment of template 920 available through the EM 910 includes a services template for packaging services available on the internet and sending them in an email. Nonlimiting examples of services include picture files, music or audio files, video files, gift certificates, electronic transfer of money, etc. Template 920 can also include a "wrapping" or packaging service. The background of the email message can be indicated, as well as other email characteristics and plugin properties.

For example, when a user wants to send a .gif file, the user can indicate particular stationery as a background to "wrap" it in. The email medium is used for sending a .gif file and orchestrating all other pieces that can be packaged with it. The user can also select music, a game, or a web page as nonlimiting examples that might go along with the gif file. In another example, a user desires to send a music file. Template 920 can provide an option to attach a music file already on the user's system, or it can have an option to download a song from an online music store. Template 920 can include an entry for payment for the online download. In another exemplary embodiment, a user can send a photograph. Template 920 can include a link to a website photograph repository, or it can download the photograph from the repository.

These embodiments are part of a purposeful assembly. Template 920 allows a user to assemble and to store services for transmission in an email. A user uses an e-mail pull-through template with items to select and add to the email. EM 910 can be used as an electronic packaging store for assistance in orchestrating a delivery of services.

The preparation of services in an email using EM 910 is applicable to both email-client and web-based environments. A browser may be used for web-based environments; however, a browser is not necessary. EM 910 may access personal profile options. When EM 910 is employed by a particular user, EM 910 accesses a profile of the particular user stored in a database on a server to determine the services available to that particular user. As a nonlimiting example, EM 910 determines what services the user has in his Unite States Post Office account.

In one embodiment, a user opens an email and accesses template 920 in EM 910. In template 920, the user selects the service that he would like to send. In one nonlimiting example, the user can select a gift card or gift certificate. A gift card window opens up and authenticates the user by passing credentials of the user and matching the credentials in a database to determine that the user is a registered user. The user can select the type of gift certificate and the amount of the gift certificate. Then the user can indicate the method of payment (PayPal, credit card, etc.). The gift certificate can be bundled in, or attached to an email as if it were a package in the mail and a passkey can be generated for security purposes. In an exemplary embodiment, the passkey is a link within the email.

In one embodiment, EM 910 is a form of an electronic money account with a password, including a service and electronically packaged with graphical, musical, or other presentational aspects—packaged in an email message. If EM 910 is web-based, web pages can be generated real-time on a web server. If, in another embodiment, it is client-based, EM 910 may be presented in a real-time generated web page or in a customized format. Nonlimiting examples of aspects that can be configured include notification method, creation of a distribution list, setup as a recurring event, format, agenda, structure, and save for reuse.

FIG. 10 presents a flow chart for the employment of EM 910 by a user. In block 1000, the user enters EM 910 in email application 900. In block 1010 the user selects the type of event he would like to manage and in block 1020, he configures the event by entering information into corresponding template 920. In configuring the event, the user selects aspects of the event as well as aspects of the surrounding environment of the email (wallpaper, background music, etc.). In block 1030, the user fulfills his payment obligation if any is required. In block 1040, the user sends the email.

FIG. 11 presents a flow chart for the configuration of the email by EM 910. In block 1100, EM 910 offers selections of template 920. In block 1110, EM 910 receives input as entered by a user into template 920. In block 1120, EM 910 determines if payment is necessary for any of the services selected in template 920. If no payment is required, in block 1140, EM 910 attaches the service in an email and, in block 1150, sends the email. If, in block 1120, EM 910 determines that payment is required, EM 910 accepts payment corresponding to the user's obligation. In block 1140, EM 910 attaches the requested services in an email. In block 1150, EM 910 sends an email.

Figure 12:
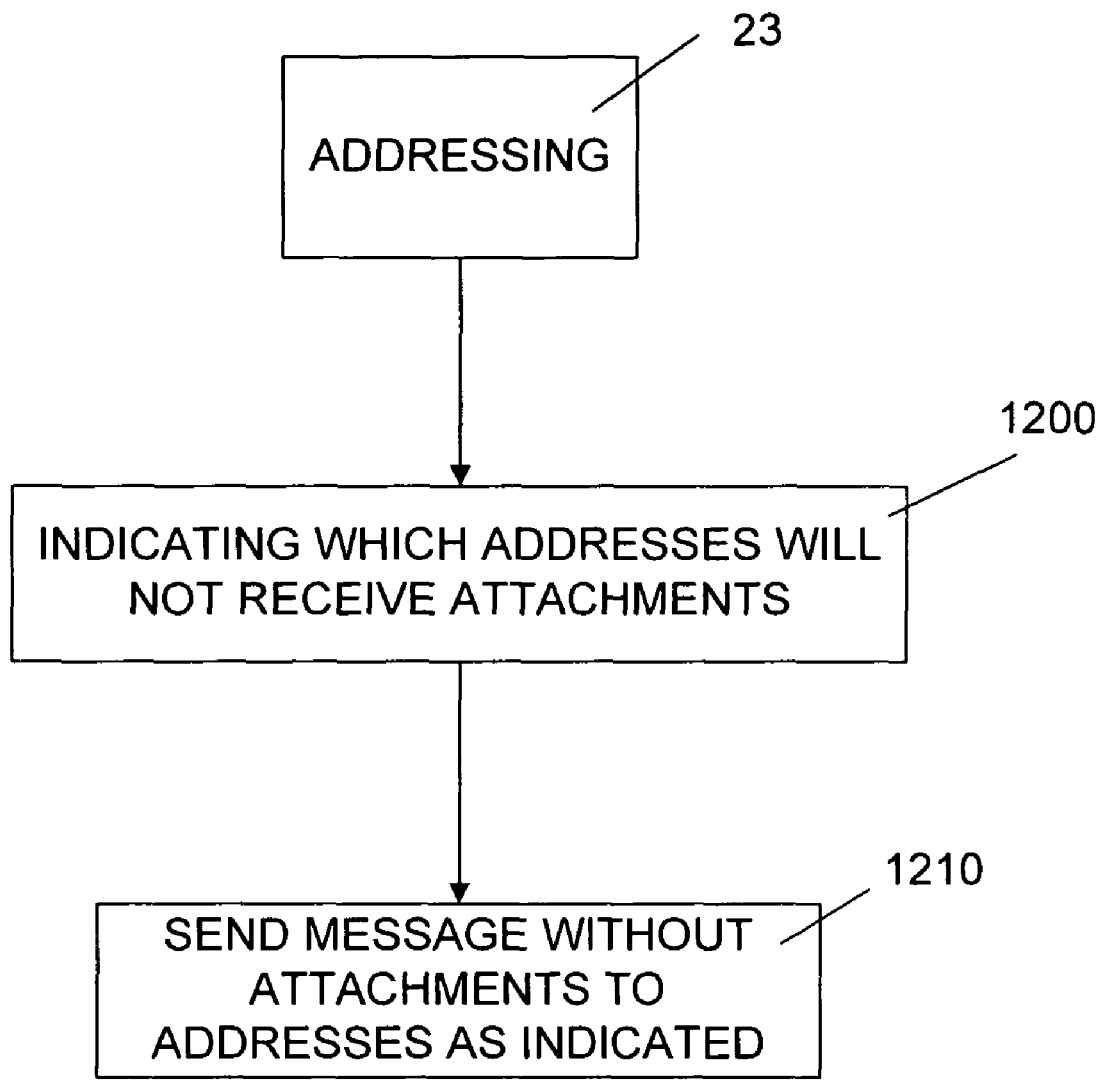
FIG. 12 is a flow diagram of an exemplary embodiment of indicating which recipients do not receive attachments in the addressing step in FIG. 2.

FIG. 12 illustrates an alternative embodiment including a template with an option to select recipients of the address list who do not receive attachments to a message, but only receive the body of the message. In block 23, the user first forms a list of recipients of an email with attachments. In block 1200, the user then selects particular recipients of the list who will receive only the body of the message, without attachments. This embodiment applies to email messages and instant messages, among others. In block 1210, the message is sent without attachments to those on the list as indicated. Of course, the message is sent with attachments to the rest of the list. In one embodiment, a list of the recipients that don't receive the attachments is embedded in the opening text of the message. A non-limiting example includes:

- - -

"This message was sent to the following recipients without the attachments: john@pully.com <JOHN PULLY>, roger@pully.com <ROGER SMITH>."

Please review the attached document before tomorrow's meeting. If you can't make the review session, please send an alternate.

Attachment 1.doc

- - -

When the message is received by the recipients that are designated as receiving without attachments, those recipients receive the message with the attachments removed.

Figure 13:
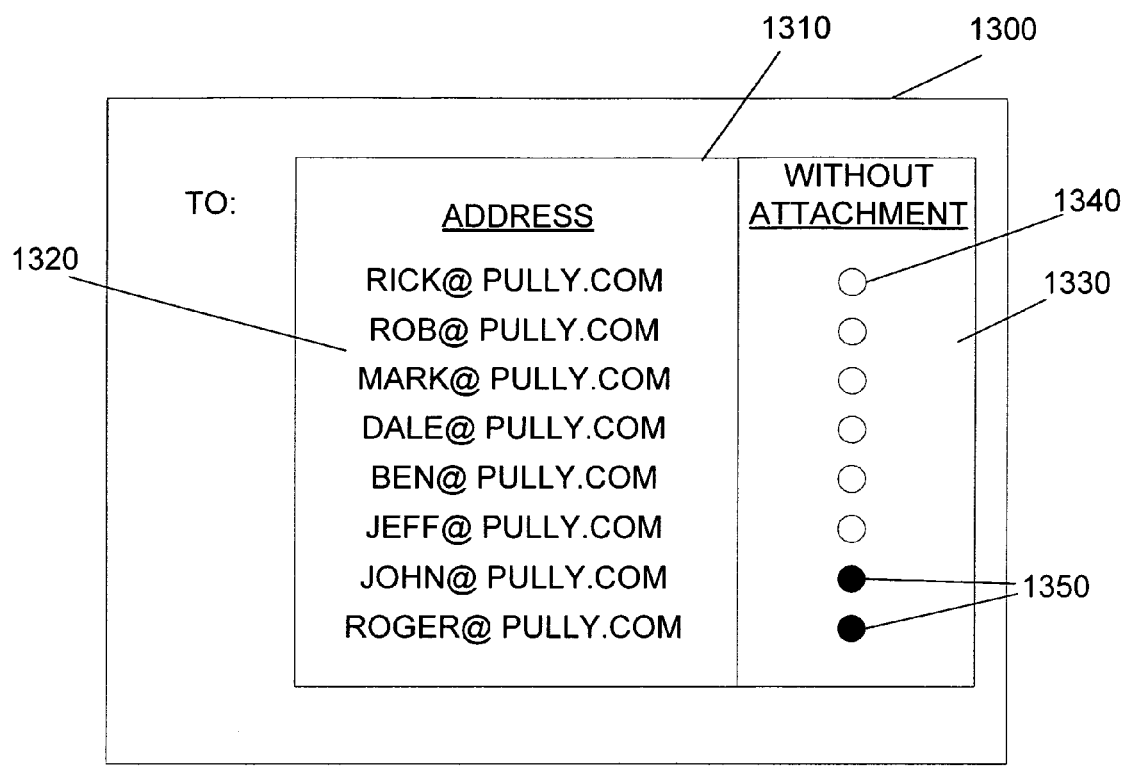
FIG. 13 is an exemplary embodiment of a graphical user interface for an address list for indicating which recipients do not receive attachments.

FIG. 13 presents an exemplary embodiment of a graphical user interface (GUI) screen display, which may be used to address a message and indicate particular addresses that will not receive the attachments. When the address bar is selected in message 1300, address template 1310 is displayed. Address template 1310 comprises address list 1320 and corresponding attachment indicator list 1330. In one embodiment unchecked radials 1340 indicate that attachments are included with messages to the corresponding address in address list 1320. Checked radials 1350 indicate that attachments are not included with message to those corresponding addresses in address list 1320.

Embodiments of the present disclosure can be implemented in hardware, software, firmware, or a combination thereof. In exemplary embodiments, the substitute URL generator is implemented in software or firmware that is stored in a memory and that is executed by a suitable instruction execution system. If implemented in hardware, as in an alternative embodiment, the substitute URL generator can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow charts show the architecture, functionality, and operation of possible implementations of the electronic mail configuration software. In this regard, each block represents a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved, as will be further clarified hereinbelow.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The electronic mail configuration program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

The foregoing disclosure of embodiments of the present invention and specific examples illustrating the present invention have been present for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

Therefore, at least the following is claimed:

1. A method for providing services by email comprising:
a computer opening a graphical interface for composing an email message, wherein the graphical interface provides a series of templates used in composing the email message for which a respective template prompts a user to supply information to be used to complete a requisite component of the email message, the series of templates comprising at least one of a template for composing email message text; a template for selecting an attachment for the email message; a template for selecting one or more recipients of the email message; and a template for identifying which of the recipients are to receive an attachment as part of the email message;
the computer receiving a request to access a template of services from the series of templates provided by the graphical interface;
in response to the request, the computer displaying a template of services available to be attached to the email message, the template of services including a service for purchasing a media file from a store and attaching the purchased media file as an attachment to the email message;

the computer receiving a selection of a service from the template of services to be attached to the email message;

request payment for the service attached to the email message;

accepting payment for the services attached to the email message, wherein the payment is supplied as part of the information that is required by a template of the series of templates to compose the email message;

the computer attaching the selected service to the email message; and the computer sending the email message.

2. The method of claim 1, wherein the service is sending an electronic product.

3. The method of claim 2, wherein the product is packaged with at least one of a gift card, wallpaper, and background music.

4. The method of claim 2, wherein the product is at least one of money, a gift certificate, an audio file, a video file, a photograph, and a graphic file.

5. The method of claim 1, wherein the template is provided in at least one of an email client and a web-based environment.

6. The method of claim 1, further comprising:

authenticating a particular user; and referencing a profile of the particular user to determine services available for the particular user.

7. The method of claim 1, further including making available certain one of the services to a particular user in the template.

8. The method of claim 1, further comprising saving the email message on a server whereby the message can be used as a sub-template.

9. A computer readable storage medium with logic embedded therein for performing a method of providing services by email comprising:

logic for opening a graphical interface for composing an email message, wherein the graphical interface provides a series of templates used in composing the email message for which a respective template prompts a user to supply information to be used to complete a requisite component of the email message, the series of templates comprising at least one of a template for composing email message text; a template for selecting an attachment for the email message; a template for selecting one or more recipients of the email message; and a template for identifying which of the recipients are to receive an attachment as part of the email message;

logic for receiving a request to access a template of services from the series of templates provided by the graphical interface;

logic for, in response to the request, displaying a template of services available to be attached to the email message, the template of services including a service for purchasing a media file from a store and attaching the purchased media file as an attachment to the email message;

logic for receiving a selection of a service from the template of services to be attached to the email message;

logic for requesting payment for the service attached to the email message;

logic for accepting payment for the services attached to the email message, wherein the payment is supplied as part of the information that is required by a template of the series of templates to compose the email message;

logic for attaching the selected service to the email message and sending the email message.

10. A computer readable storage medium with logic embedded therein for performing a method of claim 9, wherein the service is sending an electronic product.

11. A computer readable storage medium with logic embedded therein for performing a method of claim 10, wherein the product is packaged with at least one of a gift card, wallpaper, and background music.

12. A computer readable storage medium with logic embedded therein for performing a method of claim 10, wherein the product is at least one of money, a gift certificate, an audio file, a video file, a photograph, and a graphic file.

13. A computer readable storage medium with logic embedded therein for performing a method of claim 9, wherein the template is provided in at least one of an email client and a web-based environment.

14. A computer readable storage medium with logic embedded therein for performing a method of claim 9, further comprising:

logic for authorizing a particular user; and logic for referencing a profile of the particular user to determine services available for the particular user.

15. A computer readable storage medium with logic embedded therein for performing a method of claim 9, including the services available for a particular user in the template.

16. A computer readable storage medium with logic embedded therein for performing a method of claim 9, further comprising saving the email message on a server whereby the message can be used as a sub-template.

* * * * *